United States Patent [19]

Ivie

[11] 4,209,000

[45] Jun. 24, 1980

[54] FUEL INJECTION SYSTEMS

[76] Inventor: Terry L. Ivie, 4645 S. 2030 West, Salt Lake City, Utah 84119

[21] Appl. No.: 973,892

[22] Filed: Dec. 28, 1978

[51] Int. Cl.[2] .......................... F02B 77/08; F16K 17/00; F16J 3/00

[52] U.S. Cl. .......................... 123/198 DB; 123/198 D; 123/139 AW; 151/11; 92/97

[58] Field of Search ............ 123/198 DB, 198 D, 142, 123/139 AZ, 139 AW; 251/16, 17, 19, 61.1, 61.2, 335 A; 92/97, 48

[56] References Cited

U.S. PATENT DOCUMENTS

| | | | |
|---|---|---|---|
| 1,540,017 | 6/1925 | Kendall | 251/61.2 |
| 3,075,537 | 1/1963 | Poster | 123/198 DB |
| 3,115,951 | 12/1963 | Fox | 123/198 DB |
| 3,148,671 | 9/1964 | Bottorff | 123/136 |
| 3,638,629 | 2/1972 | Moon | 123/139 AZ |
| 3,835,899 | 9/1974 | Holder | 251/61.2 |
| 3,915,132 | 10/1975 | Thornburgh | 92/48 |
| 3,941,035 | 3/1976 | Mueller | 92/48 |
| 4,054,116 | 10/1977 | Goddington | 123/139 AZ |
| 4,062,336 | 12/1977 | Gant | 123/139 AF |
| 4,147,144 | 4/1979 | Furucz | 123/198 DB |

FOREIGN PATENT DOCUMENTS

| | | | |
|---|---|---|---|
| 1355049 | 5/1974 | United Kingdom | 123/198 D |

*Primary Examiner*—Charles J. Myhre
*Assistant Examiner*—Carl Stuart Miller
*Attorney, Agent, or Firm*—M. Ralph Shaffer

[57] ABSTRACT

An improvement in fuel injection systems for diesel engines, by way of example, wherein, between the engine shutdown unit of the fuel pump and the air shutdown line from the cab there is interposed suitable structure which is responsive both to raised pressure in the fuel return line of the system and also to the air shutdown system for turning off fuel supply to the engine, either intentionally or by virtue of tampering with the fuel return line by the operator.

5 Claims, 6 Drawing Figures

FUEL INJECTION SYSTEMS

FIELD OF THE INVENTION

The present invention relates to fuel injection systems, principally for diesel engines, and more particularly, relates to an improved fuel injection system and improvement therein where unauthorized tampering with the fuel return line, as hereinafter pointed out, will result in an automatic actuation of the engine shut-down structure associated with the fuel pump so as to interrupt fuel flow to the engine used.

DESCRIPTION OF PRIOR ART

In the past, diesel engine fuel injection systems, for example, have included a fuel return line that collects excess fuel delivered by the fuel pump to the injectors and returns such fuel to the fuel tank for reuse.

During certain times of driving a truck or tractor, the driver will frequently tamper with the fuel return line as, for example, by pinching the line so as to raise the pressure in this line and therefore raise the pressure of fuel being injected into the engine. Such act by the driver in attempting to increase the power of the tractor results in a number of malfunctions in the engine so as to damage the pump, overheat the engine as a result of increasing heat load on the engine coolant system beyond designed limitations, impeding fuel flow relative to the injectors and often damaging these injectors, and so forth.

What is needed therefore is some automatic means of shutting down the engine should the operator tamper with the fuel return line as by tending to squeeze or crimp the line at a point proximate its routing to the fuel tank. Certain prior art United States patents are pertinent, as follows U.S. Pat. Nos.: 3,638,629; 4,054,116; Re. 27,108; 3,148,671; 3,115,951; 3,075,537.

As these patents illustrate, there have hitherto been designed, for certain specialized purposes, some type of control of the engine and/or its fuel supply or oil pressure in response to certain phenomena occurring. A specific problem raised in the present invention has been recognized in the Moon U.S. Pat. No. 3,638,629, as above recited. Such patent teaches the problem involved but sets forth a rather complicated and totally dissimilar way of approaching the problem by way of introducing into the fuel flow circuit a governor for controlling the flow of fuel in the supply system in response to elevated fuel pressure in the return line. The invention described in Moon, however, does not utilize the device employed in the air shutdown system which the present invention does perform. It is to be noted that in many types of diesel engine designs utilizing for example the P.T. fuel system, the cab of the truck or tractor will be supplied a suitable air shutdown control, with an air line leading from proximate the fuel pump to the cab so that the operator, with the use of compressed air, can actuate the engine shut-down unit associated with the fuel pump so as to interrupt voluntarily the flow of fuel to the engine.

BRIEF DESCRIPTION OF THE PRESENT INVENTION

In a preferred embodiment of the present invention, and in contrast with all of the prior art as above referenced, there is employed an adaptor-valve unit between the standard air shut-down line and the engine shut-down unit associated with the fuel pump so that either the air in the air shut-down system or the raised pressure of the fuel in the fuel return line will be operative to actuate the air shut-down to turn off the flow of fuel to the engine and stop the engine. The structure is so designed, by suitable plungers being employed, so that either the air from the cab and the air shut-down system or the fuel under increased pressure in the fuel return line is operative to actuate the air shut-down unit.

OBJECTS

Accordingly, a principal object of the present invention is to provide a new and improved fuel injection system.

A further object is to provide a unit that can be actuated, either voluntarily by an air shut-down system or automatically by increased pressure in a fuel return line utilized, so as to interrupt fuel flow to an engine operatively associated with the structure.

A further object is to provide against unauthorized tampering with the fuel return line of a fuel injection system whereby the fuel pump utilized is provided with an engine shut-down unit that is automatically actuated by excessive fuel pressure in the fuel return line or by any other means such as an air shut-down system normally associated with engine shut-down provided the fuel pump.

The features of the present invention which are believed to be novel are set forth with particularity in the appended claims. The present invention, both as to its organization and manner of operation, together with further objects and advantages thereof, may best be understood by reference to the following description, taken in connection with the accompanying drawings in which:

BRIEF DESCRIPTION OF FIGURES

In FIG. 1 the engine 10 is provided with a fuel system 11 incorporating fuel pump 12. The latter is of standard make and is provided with the usual throttle linkage 13. Connected by conventional means in a usual manner to the fuel pump is an engine shut-down unit 14 of common make. To the engine shut-down unit is bolted or otherwise secured a valve adaptor unit 15 shown in FIGS. 1 and 4, by way of example. The internal construction of valve adaptor unit 15 will be hereinafter described. At this point it is to be noted that a fuel return pressure line 16 leads from valve adaptor unit 15 to fuel return line 17 and, in fact, tees into fuel return line 17. Fuel return line 17 is secured, whether directly or indirectly to the engine 10 and leads to fuel tank 18. A fuel line 19 is routed from fuel tank 18 and serves as a fuel line in-put to the fuel pump 12. There is likewise provided, of course, an engine fuel line 20 disposed between and respectively communicating with engine 10 and engine shut-down unit 14.

The structure as thus far described, save for the inclusion of valve adaptor unit 15 and fuel return pressure line 16, is strictly conventional. Thus, the usual air shut-down line 21 leading from the cab commonly is connected directly to engine shut-down unit 14. In the present invention, and in contrast with the usual configurement, valve adaptor unit 15 is interposed between line 21 and engine shut-down unit 14; also, an additional line 16 is added.

Figure 4:
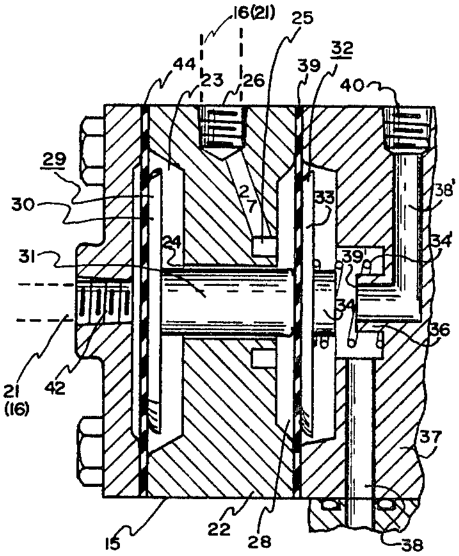
FIG. 4 is an enlarged vertical section taken along the line 4—4 in FIG. 2 and illustrates the valve adaptor unit with its diaphragms and flange installed, the rear diaphragm being co-terminous with the standard engine shut-down unit normally associated with the fuel pump of the engine.
Figure 2:
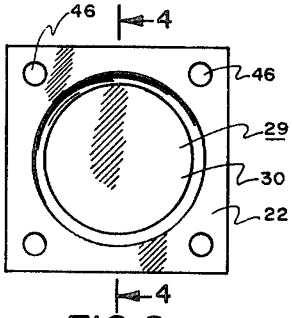
FIG. 2 is an enlarged elevation of the valve adaptor unit employed in the invention and is taken along the line 2—2 in FIG. 1.
Figure 3:
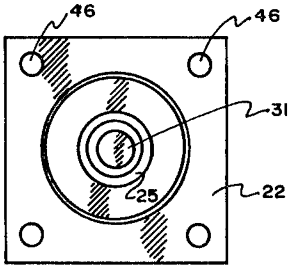
FIG. 3 is an enlarged elevation of a face of the valve adaptor unit and is taken alone the line 3—3 in FIG. 1.

As to the structure of the valve adaptor unit 15, the same is best seen in FIG. 4. Unit 15 specifically includes a body 22 that is provided with recess 23, a central internal bore 24, an annular groove 25, a port 26, and connecting passageway 27 disposed between and interconnecting port 26 with groove 25. A recess or depression 28 is likewise provided. Plunger 29 is provided with a head 30 and also a stem 31. Correspondingly, plunger 32, normally supplied the engine shut-down unit, is provided with head 33 and stub stem 34. Compression spring 34′ seats over stem 34 and is secured about boss 36 for positioning purposes. The engine shut-down unit will normally be supplied with a body 37 provided with fuel passageways 38 and 38′. The latter is provided with a connection port 40. Compression spring 34′, as is seen in FIG. 4, keeps the plunger 32 pressed to the left such that plunger 29 is likewise positioned generally to the left. Line 16 is coupled to the port 26 as indicated.

Figure 5:
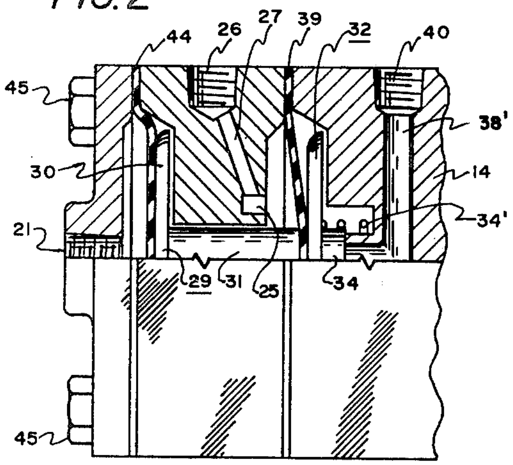
FIG. 5 is a view similar to FIG. 4 but illustrates the diaphragms as being distended to the right, as hereinafter explained.
Figure 6:
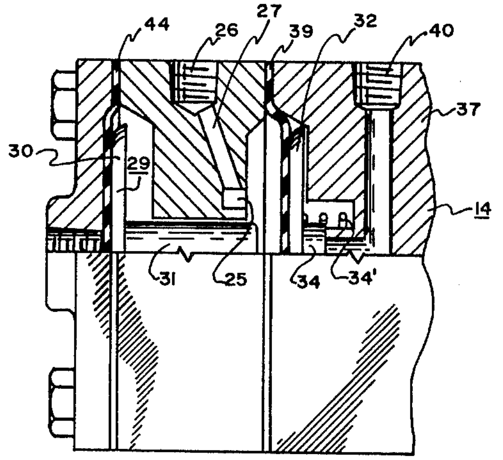
FIG. 6 is similar to FIG. 5 but illustrates the forward diaphragm as being distended to the left.

FIGS. 2, 3, 5 and 6 likewise disclose the structure of FIG. 4, howbeit as to FIGS. 5 and 6 in various operating conditions. The fuel passageways 38 and 38′ provide for fuel flow via fuel line 20 to engine 10.

It should be observed at the outset and especially where diesel engines are involved, that all of the fuel delivered by the fuel pump to the engine will not be utilized, this for a variety of reasons and purposes; the excess fuel therefore is recovered and routed back to the fuel tank for reuse. In the usual situation where diesel engines are involved, the air shut-down line 21 will be coupled in some way to block or body 37 in FIG. 4 so that the pressured air within line 21 will be effective to depress diaphragm 39 to the right, thereby to force the stub stem 34 to the right against the pressure of spring 34′, whereby to block the opening of passageway 38′ at area 39′ and thereby preclude fuel flow from passageway 38 to and through passageway 38′.

Figure 1:
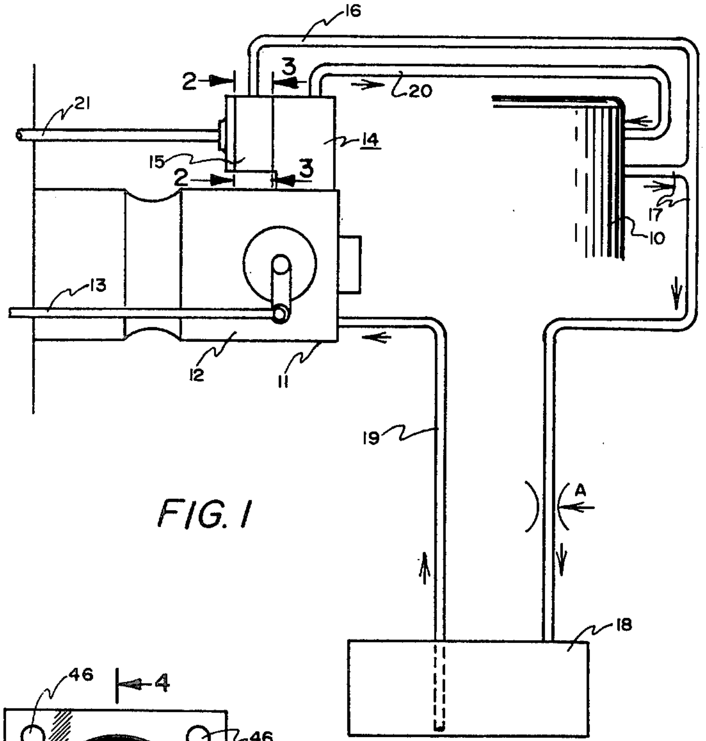
FIG. 1 is a fragmentary partially schematic view showing an engine system adapted and modified in accordance with the principles of the present invention.

In the present invention, and with the interposition of valve adaptor unit 15, assume for the moment that fuel return pressure line 16 is coupled to port 26 and that the air shut-down line 21 is connected to port 22. In such event pressured air can be used directly to shut down the engine by the air shut down line being actuated from the cab so as to supply pressured air to the lefthand surface of the diaphragm 44, thereby advancing plunger 29 to the right and, thus, advancing plunger 32 to the right so that stub 34 closes off opening 39′. This would be a direct voluntary operation by the operator or driver of the truck so that when he chooses to shut off the engine, he may do so by the usual air shut-down mechanism and technique. Suppose, however, that pressure is exerted at A as seen in FIG. 1 whereby the operator, contrary to instructions, attempts to increase the pressure in line 17, this contrary to standard operating procedures. Often times said drivers do attempt this act in the hopes of building or increasing fuel pressure so that when the truck is traveling up a grade, increased power is achieved. This, again, is damaging to the engine and its fuel pump and the operator or driver will be forewarned that should such an unauthorized act as squeezing the line at A occurs, the engine will automatically shut down. This is accomplished through the increased pressure in the fuel return line being translated through port 26 to the lefthand side of a second diaphragm 39, in which event the diaphragm itself will be distended to the right so as to force the plunger 32 to the right and hence allow the stub or stub stem 34 to close opening 39′, thereby shutting off the fuel flow via passageways 38 and 38′ to the engine. It is noted that the fuel pressure is insulated from the air line 21 by virtue of both diaphrams 44 and 39 being utilized, and with the fuel being confined in the space between such diaphrams. It is noted that passageway 27 provides communication for the pressured return line fuel from port 26 to groove 25 and hence to the left side of diaphragm 39.

FIG. 6 illustrates the situation where the rise in fuel pressure in the fuel return line which has occurred through the squeezing of conduit 17 at A, will result in the repositionment of the diaphragms in the manner shown in FIG. 6. FIG. 5, however, illustrates the usual operating procedure wherein air pressure from the air shut-down line 21 has been used, alone, to translate both the plungers to the right as seen in FIG. 5, whereby to effect a closure of passageway 38′.

At this point it will be observed that the connections of the air shut-down line 21 and fuel return pressure line 16 may be reversed relative to ports 26 and 42 in FIG. 4, and this same operation will occur. In either event, either the air pressure in the air shut-down line or the rising fuel pressure within fuel return line 16 will be effective to close opening 39′ and hence shut off the flow of fuel to the engine and hence terminate engine operation.

When the operator or user is informed that the engine will simply shut down in the event he attempts to squeeze or apply pressure to fuel return line 17, then he will simply not perform such an unauthorized act and otherwise use the truck in its proper manner. Bolts 45, mounting attachment flange 47 over diaphragm 44 to body 22, and apertures 46 are provided for the respective parts for attachment purposes to the engine shut-down unit. Apertures 46 will be found of course in aligned position as to the parts of the adaptor unit.

While particular embodiments of the present invention have been shown and described, it will be obvious to those skilled in the art that changes and modifications may be made without departing from this invention in its broader aspects, and, therefore, the aim in the appended claims is to cover all such changes and modifications as fall within the true spirit and scope of this invention.

I claim:

1. In a fuel injection system provided an engine including a fuel supply tank, a fuel pump provided with an air shut-down unit, an operator-actuated air shut-down line, an intake fuel line leading from said tank and connected to said fuel pump, an engine-routed fuel line leading from said air shut-down unit to said engine, and an overflow fuel return line coupled between said engine and said fuel tank: an improvement comprising first means for translating elevated fuel pressure in said overflow fuel return line, and second means interposed between said air shut-down line and said air shut-down unit and coupled via said translating means to said overflow fuel return line, said second means being responsive to elevated fluid pressure in either of said lines for actuating said air shut-down unit, thereby discontinuing fuel flow to said engine.

2. The apparatus of claim 1 wherein said translating means comprises a conduit coupled to and between said air shut-down unit and said overflow fuel return line.

3. The apparatus of claim 1 wherein said air shut-down unit includes a fuel passageway and a movable valve operatively associated therewith, said second means having a pair of inlet ports, movable plunger means for actuating said valve, and a diaphragm separating said ports and disposed end-adjacent said plunger means for actuating the same.

4. The apparatus of claim 3 wherein said valve comprises a spring-biased plunger backed by a second diaphragm disposed opposite-end-adjacent said plunger means, said plunger means engaging said second diaphragm, said diaphragms isolating said ports also from said second plunger.

5. An adaptor for a fuel injection system comprising a body having an internal bore, first and second mutually-spaced diaphragms mounted for respectively facing opposite ends of said bore, a plunger movably disposed axially in said bore and positioned solely between said diaphragms, and a conduit attachment flange secured over said first diaphragm to said body, said body being provided with a lateral passageway terminating in an exterior connection port and an interior opening communicating with said second diaphragm.

* * * * *